United States Patent
Lo et al.

(10) Patent No.: US 8,676,394 B2
(45) Date of Patent: Mar. 18, 2014

(54) INTEGRATED DEMAND RESPONSE FOR ENERGY UTILIZATION

(75) Inventors: George Lo, Plainsboro, NJ (US); Thomas Gruenewald, Somerset, NJ (US); Georg Muenzel, Plainsboro, NJ (US)

(73) Assignee: Siemens Aktiengesellschaft, München ( * ) Notice: Subject to any disclaimer, the term of this patent is extended or adjusted under 35 U.S.C. 154(b) by 341 days.

(21) Appl. No.: 13/161,730

(22) Filed: Jun. 16, 2011

(65) Prior Publication Data
US 2012/0004783 A1   Jan. 5, 2012

Related U.S. Application Data

(60) Provisional application No. 61/359,897, filed on Jun. 30, 2010.

(51) Int. Cl.
*G05D 11/00* (2006.01)
*G06Q 50/06* (2012.01)
*H02J 3/14* (2006.01)

(52) U.S. Cl.
CPC .. *G06Q 50/06* (2013.01); *H02J 3/14* (2013.01)
USPC ............................ 700/295; 700/291; 700/286

(58) Field of Classification Search
None
See application file for complete search history.

(56) References Cited

U.S. PATENT DOCUMENTS

| | | | |
|---|---|---|---|
| 2,889,466 A | 6/1959 | Brownlee | |
| 4,090,088 A * | 5/1978 | McMahon et al. | 307/38 |
| 4,181,950 A * | 1/1980 | Carter, II | 700/291 |
| 4,213,182 A * | 7/1980 | Eichelberger et al. | 700/296 |
| 4,363,101 A * | 12/1982 | Czerniejewski | 700/291 |
| 4,368,519 A * | 1/1983 | Kennedy | 702/61 |
| 4,370,723 A * | 1/1983 | Huffman et al. | 700/295 |
| 4,412,136 A | 10/1983 | Kaya et al. | |
| 7,130,719 B2 * | 10/2006 | Ehlers et al. | 700/276 |
| 7,343,226 B2 * | 3/2008 | Ehlers et al. | 700/276 |
| 7,928,839 B2 * | 4/2011 | Chambers et al. | 340/500 |
| 7,949,615 B2 * | 5/2011 | Ehlers et al. | 705/412 |
| 7,953,518 B2 * | 5/2011 | Kansal et al. | 700/295 |
| 8,078,330 B2 * | 12/2011 | Brickfield et al. | 700/291 |
| 8,335,593 B2 * | 12/2012 | Johnson et al. | 700/285 |

(Continued)

FOREIGN PATENT DOCUMENTS

GB   2 368 312 A   5/2002

OTHER PUBLICATIONS

European Search Report dated Dec. 15, 2011.

*Primary Examiner* — Mohammad Ali
*Assistant Examiner* — Kelvin Booker
(74) *Attorney, Agent, or Firm* — Michele L. Conoiver (57) ABSTRACT

A method for managing power consumption within a facility includes receiving a request to reduce a total level of power consumption within the facility by a predetermined measure (S23). A plurality of operating parameters indicative of how much power is being consumed by each of a plurality of facility systems is received (S21). A corresponding cost associated with a marginal power reduction is determined for each of the plurality of facility systems using the received plurality of operating parameters (S24). A power allocation to the facility system of the plurality of facility systems that is determined to have a lowest marginal cost of power reduction is incrementally reduced (S25). The steps of determining a corresponding cost and incrementally reducing power are repeated until the total level of power consumption within the facility has been reduced by the predetermined measure.

21 Claims, 5 Drawing Sheets

(56) References Cited

U.S. PATENT DOCUMENTS

| | | | |
|---|---|---|---|
| 8,339,069 B2* | 12/2012 | Chemel et al. | 315/297 |
| 8,368,321 B2* | 2/2013 | Chemel et al. | 315/294 |
| 8,417,360 B2* | 4/2013 | Sustaeta et al. | 700/28 |
| 2003/0171851 A1* | 9/2003 | Brickfield et al. | 700/286 |
| 2004/0117330 A1* | 6/2004 | Ehlers et al. | 705/412 |
| 2004/0133314 A1* | 7/2004 | Ehlers et al. | 700/276 |
| 2004/0138981 A1* | 7/2004 | Ehlers et al. | 705/36 |
| 2004/0139038 A1* | 7/2004 | Ehlers et al. | 705/412 |
| 2005/0034023 A1* | 2/2005 | Maturana et al. | 714/37 |
| 2005/0038571 A1* | 2/2005 | Brickfield et al. | 700/295 |
| 2005/0043862 A1* | 2/2005 | Brickfield et al. | 700/295 |
| 2005/0096797 A1 | 5/2005 | Matsubara et al. | |
| 2006/0276938 A1 | 12/2006 | Miller et al. | |
| 2007/0043477 A1* | 2/2007 | Ehlers et al. | 700/276 |
| 2007/0043478 A1* | 2/2007 | Ehlers et al. | 700/276 |
| 2007/0087756 A1* | 4/2007 | Hoffberg | 455/450 |
| 2007/0255461 A1* | 11/2007 | Brickfield et al. | 700/295 |
| 2008/0177423 A1* | 7/2008 | Brickfield et al. | 700/291 |
| 2009/0204234 A1* | 8/2009 | Sustaeta et al. | 700/29 |
| 2009/0204237 A1* | 8/2009 | Sustaeta et al. | 700/36 |
| 2009/0204245 A1* | 8/2009 | Sustaeta et al. | 700/99 |
| 2009/0204267 A1* | 8/2009 | Sustaeta et al. | 700/291 |
| 2009/0210081 A1* | 8/2009 | Sustaeta et al. | 700/99 |
| 2009/0240381 A1 | 9/2009 | Lane | |
| 2011/0112701 A1* | 5/2011 | Johnson et al. | 700/295 |
| 2011/0112875 A1* | 5/2011 | Johnson et al. | 705/7.11 |
| 2011/0118857 A1* | 5/2011 | Bodnar | 700/47 |
| 2011/0307112 A1* | 12/2011 | Barrilleaux | 700/291 |
| 2013/0024029 A1* | 1/2013 | Tran et al. | 700/278 |
| 2013/0073094 A1* | 3/2013 | Knapton et al. | 700/278 |

* cited by examiner

INTEGRATED DEMAND RESPONSE FOR ENERGY UTILIZATION

CROSS-REFERENCE TO RELATED APPLICATION

The present application is based on provisional application Ser. No. 61/359,897, filed Jun. 30, 2011, the entire contents of which are herein incorporated by reference.

BACKGROUND OF THE INVENTION

1. Technical Field

The present disclosure relates to energy utilization and, more specifically, to an integrated demand response for energy utilization.

2. Discussion of Related Art

Large scale facilities such as skyscraper office buildings and industrial plants tend to consume large amounts of energy from a variety of different sources. Sources of energy include power-grid electricity, liquid and gaseous fossil fuels, and renewable sources such as solar and wind power. The various different energy sources may each have different advantages, disadvantages and prices. Relative prices for energy sources may fluctuate depending on the time of day, current usage, or various other market factors.

Power consumption within large scale facilities may be the result of climate control systems, lighting, industrial machinery, etc.

In addition to receiving and consuming power, facilities may also be equipped with the ability to temporarily store power or the desirable effects of power using devices such as batteries, capacitors, fuel cells, hot water tanks, oil and gas reservoirs, and the like.

Control of these various systems is generally performed manually and independently and accordingly, vital energy resources and capital is often directed in a suboptimal fashion.

Inefficient use of energy has both economic and environmental consequences. Moreover, peak demand for electricity overloads the power grid and forces power providers to build additional power plants that may only be used for a few hours in a year. For example, in the US, more than 10% of the electricity infrastructure costs are spent to meet peak demand that occurs less than 1% of the time.

SUMMARY

A method for managing power consumption within a facility includes receiving a request to reduce a total level of power consumption within the facility by a predetermined measure. A plurality of operating parameters indicative of how much power is being consumed by each of a plurality of facility systems is received. A corresponding cost associated with a marginal power reduction is determined for each of the plurality of facility systems using the received plurality of operating parameters. A power allocation to the facility system of the plurality of facility systems that is determined to have a lowest marginal cost of power reduction is incrementally reduced. The steps of determining a corresponding cost and incrementally reducing power are repeated until the total level of power consumption within the facility has been reduced by the predetermined measure.

Determining a corresponding cost associated with a marginal power reduction for each of the plurality of facility systems may include estimating energy consumption based on the received plurality of operating parameters. The received plurality of operating parameters may include various sensor readings obtained from a network of sensors distributed throughout the facility. The received plurality of operating parameters may include data relating to estimated future operating conditions of the facility. The estimated future operating conditions of the facility may include a weather forecast.

The request to reduce a total level of power consumption within the facility by a predetermined measure may include a request to reduce a maximum level of instantaneous power drawn from a power grid. The request to reduce a total level of power consumption within the facility by a predetermined measure may include a request to reduce a total level of power drawn from a power grid over a particular period of time.

Determining the corresponding cost associated with the marginal power reduction for each of the plurality of facility systems may include utilizing an artificial intelligence system. The artificial intelligence system may utilize a rules database or heuristic algorithms. The artificial intelligence system may utilize a one or more heuristic algorithms.

In addition to incrementally reducing a power allocation to the facility system of the plurality of facility systems that is determined to have a lowest marginal cost of power reduction, reduction of the total level of power consumption within the facility may be achieved by reallocated power between multiple facility systems of the plurality of facility systems.

In addition to incrementally reducing a power allocation to the facility system of the plurality of facility systems that is determined to have a lowest marginal cost of power reduction, reduction of the total level of power consumption within the facility may be achieved by rescheduling an operation of one or more of the plurality of facility systems.

A method for managing power demand from a particular power source within a facility includes receiving a request to reduce a total level of power demanded from the particular power source within the facility by a predetermined measure. A schedule of power needs is received for each of a plurality of facility systems. A corresponding cost associated with a marginal power reduction for each of the plurality of facility systems is determined using the received plurality of operating parameters. A cost associated with increasing marginal power generation is determined. The power demand from the particular power source is incrementally reduced while satisfying the received schedule of power needs for each of the plurality of facility systems by performing one of marginally reducing power for one of the plurality of facility systems and marginally increasing power generation according to a lowest determined cost. The steps of determining a corresponding cost associated with a marginal power reduction for each of the plurality of facility systems, determining a cost associated with increasing marginal power generation, and incrementally reducing power demand are repeated until the total level of power demanded from the particular power within the facility has been reduced by the predetermined measure.

Increasing power generation may include generating power for utilization by the plurality of facility systems by combustion of fossil fuels. Increasing power generation may include generating power for utilization by the plurality of facility systems by harnessing solar or wind power. Increasing power generation includes generating power for utilization by the plurality of facility systems by exploiting previously stored power.

An extent to which the request to reduce a total level of power demanded from the particular power source can be satisfied by harnessing solar or wind power may be determined and incrementally reducing the power demand from the particular power source may include harnessing available solar or wind power prior to marginally reducing power for one of the plurality of facility systems and marginally increasing power generation according to a lowest determined cost.

A system for managing power consumption within a facility includes a rules database including rules governing how to generate, store, retrieve, acquire, and allocate available power between a plurality of facility systems including power-consuming devices, power-generating devices, and power-storing devices. An orchestrator receives a plurality of parameters as inputs, reads the rules of the rules database, and generates a plurality of control signals for controlling the generation, storage, retrieval, acquisition, and allocation of the available power between the plurality of facility systems. A plurality of sensors and meters located throughout the facility generates at least some of the plurality of parameters and sending the generated parameters to the orchestrator.

The power-consuming devices may include an air temperature control system or manufacturing systems. The power-generating devices may include a fossil fuel-powered generator or a renewable energy generator.

The system may additionally include an Internet connection for providing parameters to the orchestrator by subscription.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to methods and devices for efficient holistic management of energy resources and demands within large-scale facilities such as office buildings and industrial plants. Moreover, exemplary embodiments of the present invention may provide such facilities with the ability to efficiently implement a specific energy load reduction request. For example, in addition to efficient management of power supply, power storage, and power consumption, exemplary embodiments of the present invention may receive a command to reduce overall power consumption by a particular number of units and then efficiently execute the command in a manner that is most in accordance with the various interests of the facility.

Moreover, exemplary embodiments of the present invention may provide methods and devices for more evenly distributing energy use over time to solve problems associated with peak electricity usage which may contribute to overloading of power grids. These goals may be accomplished by implementing tools for optimizing energy utilization across an entire facility. According to an approach of the present invention, integrated demand response (IDR) provides a way of looking at demand response where silos of electricity consumption, on-site generation and storage become part of an integrated system. Orchestrating the system holistically in this manner may allow for greater opportunity for maximizing peak demand reduction while still meeting other constraints (e.g. throughput and comfort). Coordinating activities through automated planning and re-planning may allow the system to achieve specific goals, even as parameters change.

Figure 1:
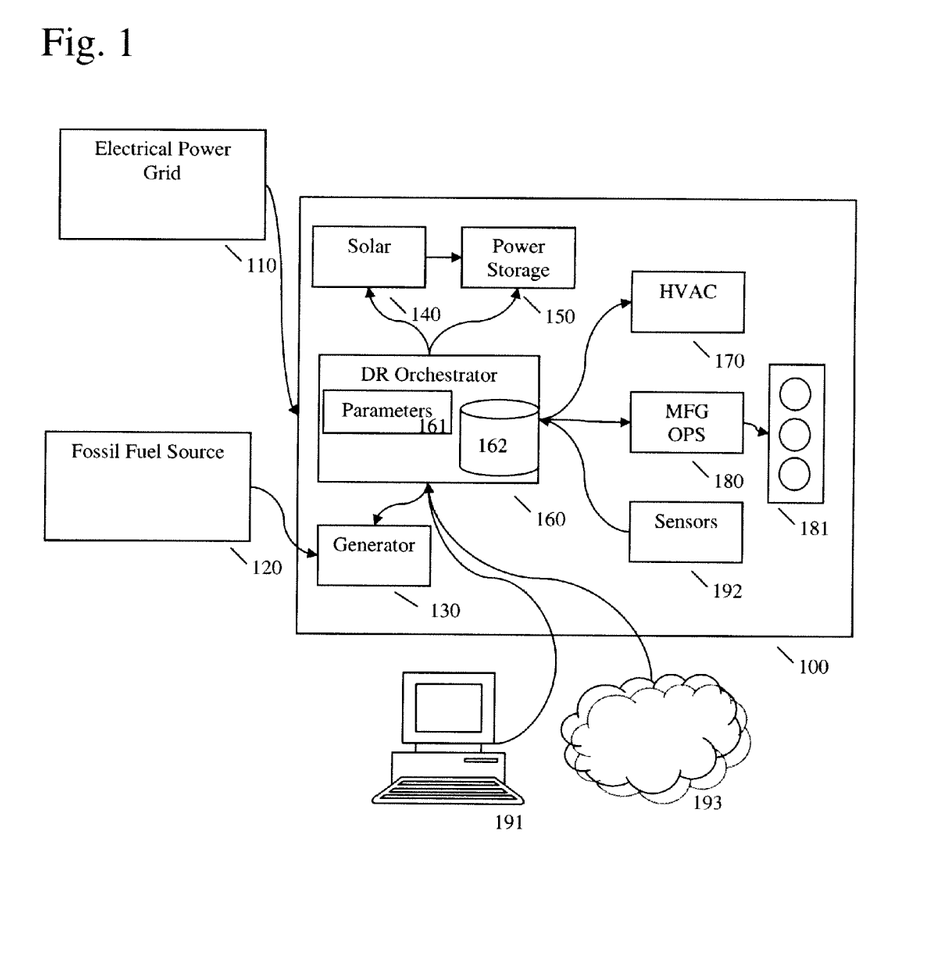
FIG. 1 is a diagram illustrating a system for providing integrated demand response (IDR) according to an exemplary embodiment of the present invention.

FIG. 1 is a diagram illustrating a system for providing integrated demand response (IDR) according to an exemplary embodiment of the present invention. A facility 100 which may be, for example, a large-scale commercial or industrial facility, may be connected to a power grid 110 and one or more liquid or gaseous fossil fuel sources 120 such as oil or gas. The facility 100 may include one or more power generation devices 130, for example, a gas burning generator, one or more renewable power generation devices 140 such as photovoltaic cells or wind turbines, and one or more power storage devices 150, such as batteries or capacitors. The generator 140 may be used, for example, to convert the fossil fuel source 120 into electrical power. The power storage devices 150 may be used, for example, to store electricity generated by the solar cells or wind turbines 140 for use when there is insufficient light or wind resources available. However, many other power generating and storing devices may be used and these devices may be used and interconnected in many different ways. The configuration shown is offered as a simplified example of a facility with representative power sources and storage devices.

Holistic power management may be handled by a demand response (DR) orchestrator 160, which may be embodied as a program of instructions executing on one or more computer systems. The DR orchestrator may have the ability to intelligently manage energy consumption such as building heating and cooling systems 170 and manufacturing operations 180, manage energy acquisition such as drawing power from the power grid 110 and generating electricity using the generators 130 and renewable sources 140, and manage energy storage and retrieval such as storing electricity to batteries 150, storing heated water to insulated tanks, or releasing the stored energy. The DR orchestrator 160 may control all of these functions and other related functions based on various parameters 161 such as fixed inputs, variable inputs, predictive inputs, and preferences.

Fixed inputs are those parameters that do not change often. An example of a fixed input is an efficiency rating for a facility system such as how much energy is required to manufacture a certain quantity of products. Fixed inputs may be changed from time to time, but unlike variable inputs, fixed inputs generally require some catalyst to change. For example, installing a new air conditioning system may change the parameter of cooling efficiency. Fixed inputs may be manually changed by a user as needed.

Variable inputs are those parameters that are constantly changing and must be continuously or periodically monitored. The monitoring of variable inputs may also be controlled by the DR orchestrator. Examples of variable inputs include the current temperature in a particular room or plant sector. Another example of a variable that may be input is energy usage, which may indicate an amount of energy consumed by the entire facility or a portion thereof either over a predetermined period of time or a level of energy being consumed at a given moment.

Predictive inputs are those parameters that are forecasted in advance. For example, tomorrow's weather report may be used as a predictive input. The DR orchestrator may control acquisition and updating of predictive inputs, for example, by RSS feed subscription or by periodic polling of various information sources.

Preferences are those parameters that are set in accordance with facility needs and user comfort. For example, a preference may be desired room temperature or a rate of manufacturing throughput. Preferences may be user-supplied and manually updated as needed. Preferences may be expressed, for example, as an optimal level along with a measure of elasticity that seeks to express how strongly the optimal level is preferred. For example, where the desired room temperature has an optimal level of 68° F., the measure of elasticity may indicate that a deviation from the optimal temperature of plus or minus 4° F. may be well tolerated while a deviation from the optimal temperature of plus or minus 8° F. may be poorly tolerated and a deviation from the optimal temperature of plus or minus 12° F. may only be acceptable during times in which the facility is uninhabited.

The DR orchestrator may be able to acquire all parameters from one or more input/output modes, such as, an administrator terminal 191 where a user can manually input parameters, a network of sensors 192 located throughout the facility that are in communication with the DR orchestrator, for example, via dedicated connections or over an intranet or other local area network, an Internet connection 193, and/or by receiving various forms of electronic documents and files.

The DR orchestrator may then employ logic to interpret the parameters and generate various control signals for controlling one or more facility systems. Facility systems controlled by the DR orchestrator may include, for example, heating and cooling systems, activation and deactivation of various power sources, containment and release of stored power, power generation, manufacturing environment conditions, such as cleanroom air filtration, assembly line speed, etc. The controlled signals generated by the DR orchestrator may directly and automatically control facility systems and/or the DR orchestrator may issue directives and/or provide signals so that human users can act in accordance with the directives or signals. For example, the DR orchestrator may issue a directive by automatically generating emails to various personnel providing them with instructions of how to operate facility systems and/or execute plant productive endeavors. According to one exemplary embodiment of the present invention, the DR orchestrator may control a set of signal lights 181 that serve to inform personnel of what tasks to engage in.

Additionally, the DR orchestrator may be tied into database management systems so that manufacturing endeavors may be automatically pursued, for example, bills of materials may be changed, parts ordered, tasks requisitioned, etc.

The DR orchestrator logic may be based on execution of a rules database and/or heuristic decision making. The logic may include an artificial intelligence capability that assesses costs and benefits associated with each control signal that the DR orchestrator is responsible for supplying, and the logic may change a control signal when the cost/benefit relationship is materially changed by consultation with the parameters. In this way, a change to the control signal may be achieved either when the parameters governing the decision change or when the logic governing the decision changes, for example, by changes made to the rules database 162, and/or changes made to the artificial intelligence heuristics. Additionally, change to the control signal may be due to the accumulation of experiential knowledge acquired by the DR orchestrator which may dictate that a new approach may be preferential to an existing approach. In this way, a change in control signals may be the result of further machine learning, which may occur even when all parameters and rules remain unchanged.

The rules database 162 may include rules that govern how to control various facility systems when various parameters are received. For example, a rule may establish that when a hot day is forecasted, the facility temperature may be brought down to a lower level prior to the start of the hot day and allowed to gradually rise to a warmer than normal temperature later in the day so that power demands may be lessened during peak hours.

Additionally, a subset of rules may pertain specifically to load shedding, or load curtailment, which may be defined as an instruction to reduce total or instantaneous energy consumption across the facility. These rules may be known as load shedding requests. A load shedding request may be used to instruct the DR orchestrator to impose a reduction of power load demand, for example, electrical load demand, of a predetermined magnitude. For example, a load shedding request may be received by the DR orchestrator to reduce electrical load, for example, a total amount of electricity demanded from the municipal power grid within a certain period of time, by either a desired number of kilowatt hours (KWH) or by a desired percentage, and/or to limit a maximum electrical load demand to a predetermined level of kilowatts, for example, to lessen burden on the electrical power grid 110 associated with peak demand.

When a load shedding request is received, the DR orchestrator may consult with the parameters and preferences to determine how to achieve the desired goad while minimizing a level of hardship. The hardship level may be measured in any desired unit; however, the hardship level may be measured in currency terms, for example, dollars. Under such an approach, every possible means of reducing power consumption at the disposal of the DR orchestrator is contemplated by the DR orchestrator and the cost of reducing each marginal unit of power is calculated for each possible means. Then, a unit of power is spared from the least expensive source and the next marginal cost of power reduction is calculated until the power load shedding has been met. In implementing such an approach, the elasticity of parameters discussed above may include a dollar cost associated with deviation from the optimal setting. For example, a dollar cost associated with the displeasure of facility occupants for deviation from the optimal temperature level of 68° F. should be estimated. In this way, the DR orchestrator can know how to balance the cost of reducing, for example, manufacturing yield with increasing facility temperature in meeting the load shedding request. The cost associated with reducing manufacturing yield can be estimated by lost profit associated with failure to produce the marginal products but the dollar cost associated with uncomfortable facility temperature may be more arbitrary and subjective. Exemplary embodiments of the present invention may thereby include the use of the DR orchestrator comparing subjective costs and/or objective costs to determine how best to reduce power consumption to a level desired while minimizing overall cost, regardless of the unit of cost selected for this purpose.

However, in most cases, the DR orchestrator will be comparing an estimated cost of reducing one productive facility system with an estimated cost of reducing another productive facility system and the comparison may be highly objective and meaningful.

In calculating the cost associated with a marginal reduction of a level of power consumed by a particular facility system, various real-time market data may be consulted. This data, as with other external factors data considered by the DR orchestrator, may be received by way of the Internet connection 193, either from freely available sources or by subscription to various information sources and databases.

For example, where reducing the throughput of production of a first product is balanced against reducing the throughput of production of a second product, knowledge of the current market price of both products may be considered. In cases where there may be a long time between when production begins on a particular product and when production is finished, economic predictions and/or futures contracts (where available) may be used to help the DR orchestrator place a dollar value on marginal cost of reducing throughput.

In another example of attributing a dollar value to marginal reduction in cost associated with each facility system, the dollar costs associated with reducing cleanroom airflow rate at the margin may be measured in reduction of manufacturing yield and the lost profit associated with that reduction of yield. Data such as, in this example, the relationship between the marginal reduction in yield associated with the marginal reduction in cleanroom air flow may be user supplied or estimated by the DR orchestrator based on previously collected data obtained while in use. According to some exemplary embodiments of the present invention, the DR orchestrator may include, or may be connected with, a simulation system for performing computer simulations to estimate marginal costs associated with power reductions to various facility systems.

The DR orchestrator, either through direct control or through generation of signals and edicts, may be able to manage every aspect of facility power management as well as production schedules for energy-consuming manufacturing and/or processing. At the most direct level, the DR orchestrator may generate a control signal for controlling an HVAC system and then send the control signal to the HVAC system where it is used to directly control the facility temperature. However, as described above, the DR orchestrator is not limited to directly controlling facility systems, the DR orchestrator may additionally, or alternatively, operate a set of signals 181 that may be used to inform facility personnel of various tasks to be performed. These signals 181 may be embodied as a series of lighted cues such as traffic-light-style indicators placed in the vicinity of various workspaces or as an automated email generation server that issues emails addressed to appropriate personnel to inform them of selected tasks associated with the desired level of energy utilization. For example, personnel may be directed to produce a first product rather than a second product or perform a first process rather than perform a second process. Additionally, the DR orchestrator may be used to influence or generate personnel schedules and/or duty rosters to ensure that appropriate personnel are on hand at appropriate times to perform the desired tasks that involve the utilization of energy resources.

For example, during times in which more power is available such as due to bright sun that is able to supply large amounts of solar power, the DR orchestrator may schedule energy-intensive processes and automatically implement necessary duty roster changes to ensure that appropriate people are onsite to perform the selected tasks. However, during times of restricted electrical supply, the DR orchestrator may take appropriate action. As the DR orchestrator is able to make use of forecasted parameters, energy-saving schedule changes may be implemented in advance of the forecasted conditions. In such circumstances where there is the potential that actual conditions do not match forecasted conditions, optimal energy efficiency may not be achieved in that instance; however, over time, significant energy savings may be realized by accounting for forecasted conditions that are more often correct than incorrect.

Figure 2:
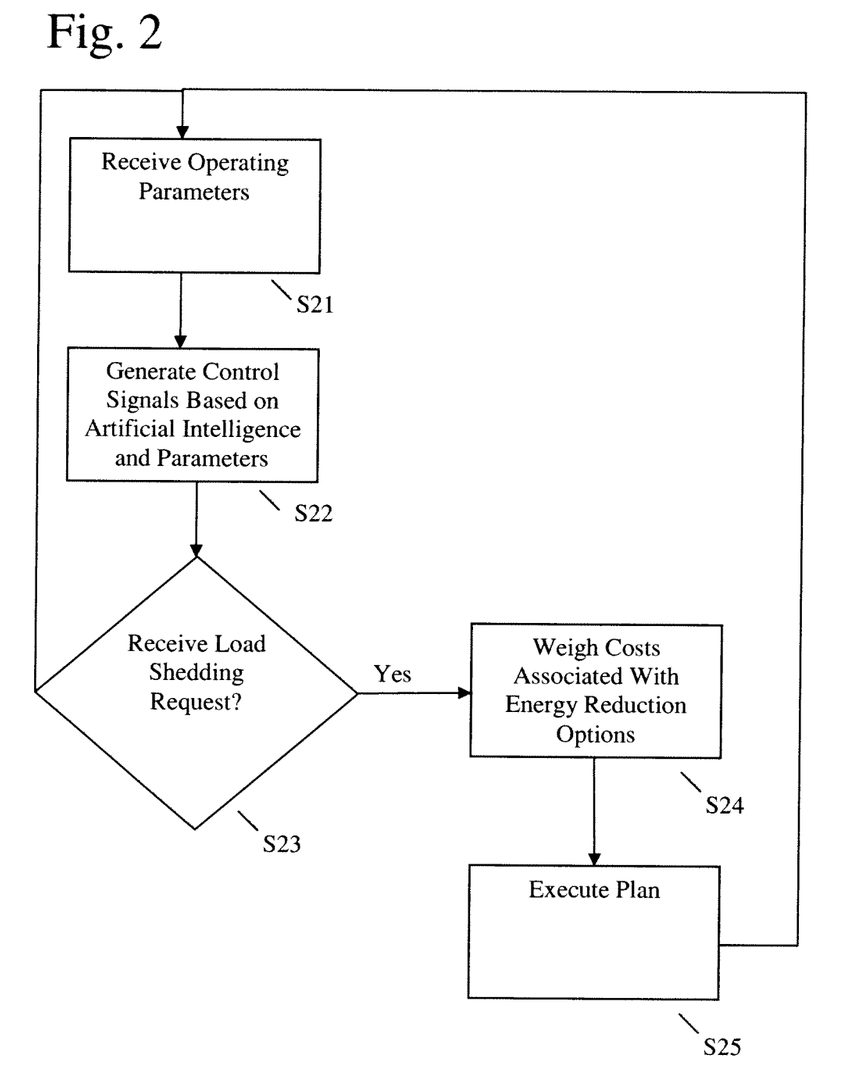
FIG. 2 is a flow chart illustrating an example of providing integrated demand response (IDR) in accordance with an exemplary embodiment of the present invention.

FIG. 2 is a flow chart illustrating an example of providing integrated demand response (IDR) in accordance with an exemplary embodiment of the present invention. First, the DR orchestrator may receive a set of operating parameters (Step S21). As described above, the operating parameters may include sensor data from various sensors and/or meters located throughout the facility such as temperature, pressure, humidity sensors, etc. or power consumption meters. The operating parameters may also include fixed inputs, variable inputs, predictive inputs, and preferences, as described above. Then, the DR orchestrator may employ artificial intelligence to generate one or more control signals based on the received parameters (Step S22). The control signals may manage energy acceptance, energy storage and retrieval, energy generation, and energy utilization. Energy acceptance may include, for example, pulling electricity from the power grid. Energy generation may include running fossil-fuel powered generators and/or harnessing energy from renewable sources such as solar and wind sources. Energy storage and retrieval may include temporarily storing energy stored from renewable sources in batteries and/or heating water for later use and then subsequent utilization of the stored energy. Energy utilization may include, for example, determining how much power, if any, to allocate to various energy-consuming facility systems, including HVAC systems, manufacturing operations, process execution, lighting, and any other systems within the facility that require power to operate.

The artificial intelligence may make use of heuristics and/or a set of predetermined rules in determining how to allocate available energy resources. If at any point a load shedding request is received (Yes, Step S23), then the DR orchestrator may make a determination as to how best to reduce energy accepted from the power grid by a desired measure (Step S24). In making this determination, the DR orchestrator may weigh relative costs associated with restricting power to various facility systems and/or boosting power generation capabilities and then orchestrate a scheduled plan for energy utilization that satisfies the received load shedding instruction in the least expensive manner available. The DR orchestrator may then execute the schedule plan (Step S25) by either direct automatic control of facility systems and/or by displaying various signals and/or circulating instructions to be followed by facility personnel.

Figure 3:
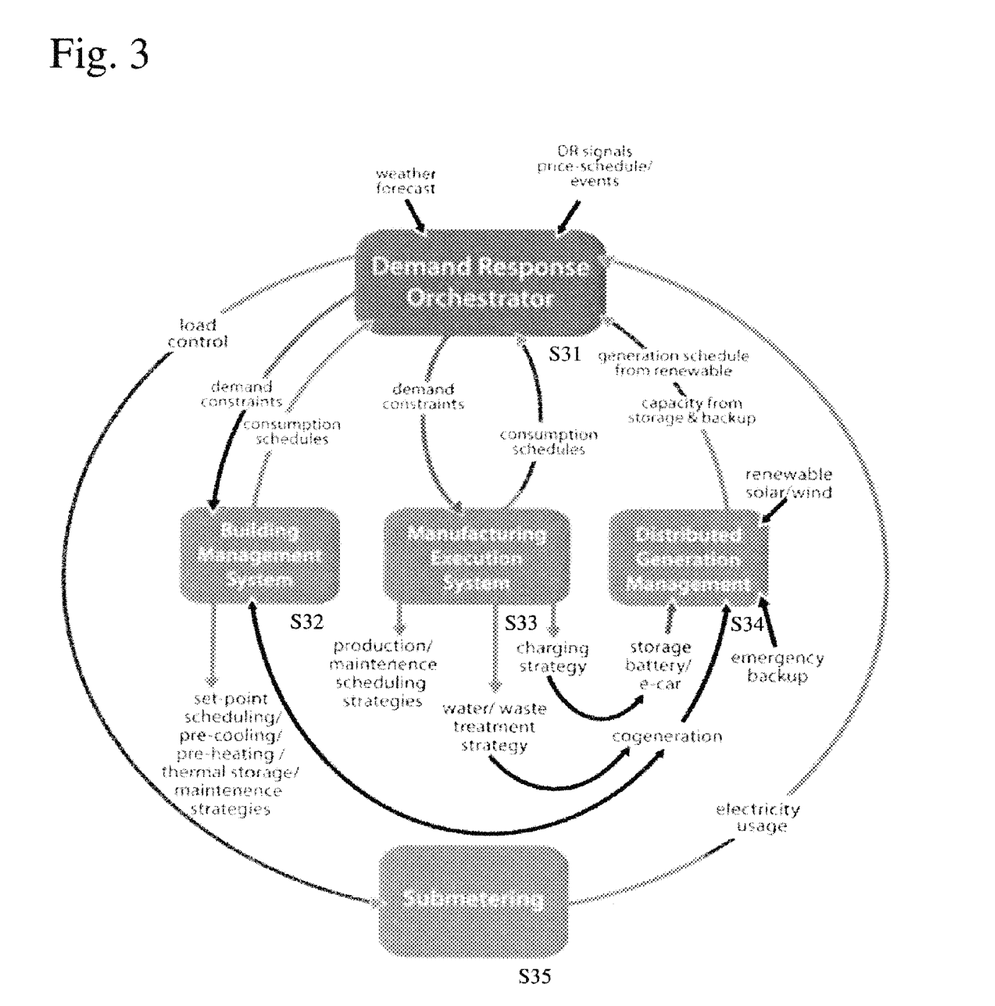
FIG. 3 is a diagram illustrating an overview of the operation of a DR orchestrator according to an exemplary embodiment of the present invention.

FIG. 3 is a diagram illustrating an overview of the operation of a DR orchestrator according to an exemplary embodiment of the present invention. The demand response (DR) orchestrator receives various inputs such as weather forecasts, DR signals price-schedule/events, electricity usage, consumption schedules, generation schedules from renewable sources, capacity from storage and backup, and produces various outputs such as load control and demand constraints (Step S31). A building management system receives demand constraints from the DR orchestrator, provides consumption schedules to the DR orchestrator, implements set-point scheduling, pre-cooling, pre-heating, thermal storage, and/or maintenance strategies (Step S32). A manufacturing execution system receives demand constraints from the DR orchestrator, provides consumption schedules to the DR orchestrator, generates production and/or maintenance scheduling strategies, water and/or waste treatment strategies, and/or charging strategies for electricity storage devices (Step S33). A distributed generation management system receives charging strategies, emergency backup power, renewable power, and provides this energy capacity to the DR orchestrator (Step S34). A submetering system receives load control commands from the DR orchestrator and provides electrical usage to the DR orchestrator (Step S35).

In this way, the demand response (DR) Orchestrator may serve as a gateway between the utility and the facility automation systems. It may convert DR signals, on-site generation and storage capacity to demand constraints. Demand constraints may establish limits on electricity usage within each domain in the facility (e.g. building, manufacturing). The Building Management System (BMS) and Manufacturing Execution System (MES) may provide consumption schedules to the DR Orchestrator. The Distributed Generation Management (DGM) may provide the generation schedule of the renewables and the storage capacity backup which can be used to compensate some of the Demand Constraints.

Integration with the facility sub-metering system may allow for the raising of alarms and triggering of fallback strategies in the event demand constraints are violated.

Figure 4:
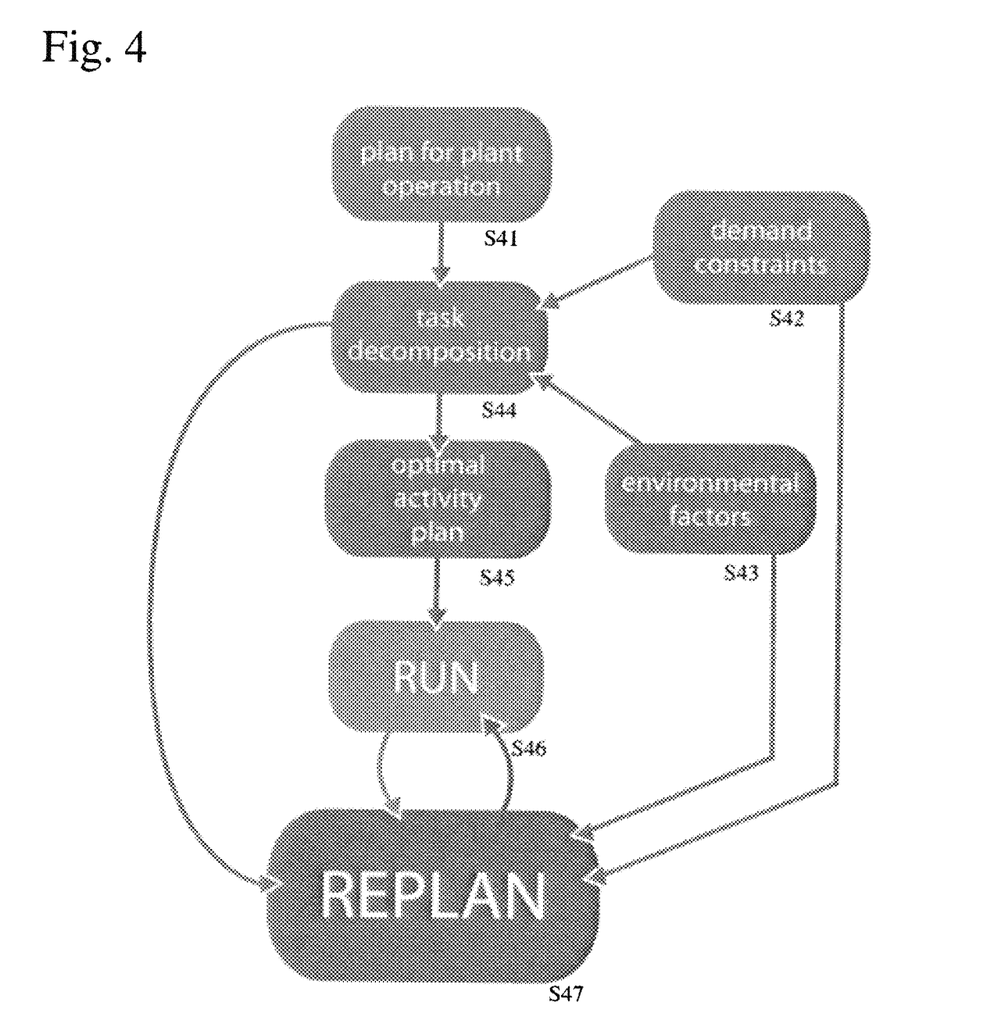
FIG. 4 is a diagram illustrating artificial intelligence planning and re-planning according to an exemplary embodiment of the present invention.

In each of the subsystems (BMS, MES, DGM) an artificial intelligence (AI) may be used to assess the costs and benefits, coordinates interdependent activities, and ensures that the total power usage is never exceeding the demand constrains and allows to re-plan dynamically when something changes or goes wring (e.g. machinery breaks down). FIG. 4 is a diagram illustrating artificial intelligence planning and re-planning according to an exemplary embodiment of the present invention. The subsystem may plan for operation (Step S41). Demand constraints may be provided by the DR orchestrator (Step S42). Environmental factors may also be provided to the subsystem (Step S43). Task decomposition may then be performed to determine the cost associated with various tasks given the demand constraints, environmental factors and the plan for plant operation (Step S44). From there, an optimal activity plan may be constructed (Step S45). The constructed plan may then be executed (Step S46). At any point, changes in the various factor may result in a re-planning (Step S47) and a new plan may be executed (Step S46).

Figure 5:
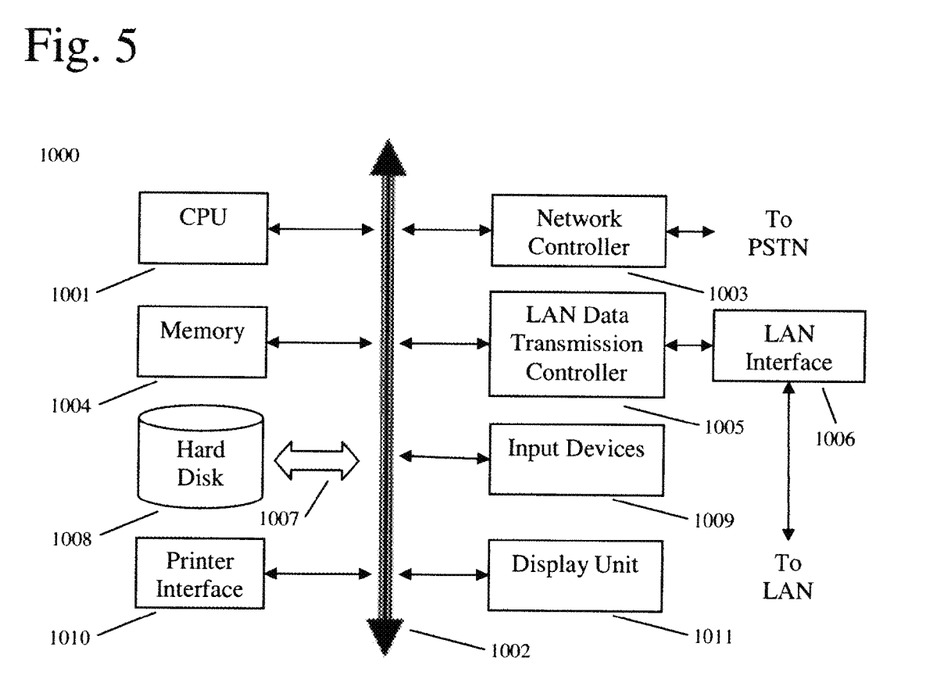
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for managing power consumption within a power-consuming facility, comprising:
   receiving, by a demand response orchestrator unit located within the facility, a request to reduce a total level of power consumption within the facility by a predetermined measure, the request having been sent by a power-generating entity;
   receiving a plurality of operating parameters indicative of how much power is being consumed by each of a plurality of facility systems of the facility;
   determining a corresponding cost associated with a marginal power reduction for each of the plurality of facility systems using the received plurality of operating parameters;
   incrementally reducing a power allocation to the facility system of the plurality of facility systems that is determined to have a lowest marginal cost of power reduction; and
   repeating the steps of determining a corresponding cost and incrementally reducing power until the total level of power consumption within the facility has been reduced by the predetermined measure.

2. The method of claim 1, wherein determining a corresponding cost associated with a marginal power reduction for each of the plurality of facility systems includes estimating energy consumption based on the received plurality of operating parameters.

3. The method of claim 2, wherein the received plurality of operating parameters includes various sensor readings obtained from a network of sensors distributed throughout the facility.

4. The method of claim 2, wherein the received plurality of operating parameters includes data relating to estimated future operating conditions of the facility.

5. The method of claim 4, wherein the estimated future operating conditions of the facility includes a weather forecast.

6. The method of claim 1, wherein the request to reduce a total level of power consumption within the facility by a predetermined measure includes a request to reduce a maximum level of instantaneous power drawn from a power grid.

7. The method of claim 1, wherein the request to reduce a total level of power consumption within the facility by a predetermined measure includes a request to reduce a total level of power drawn from a power grid over a particular period of time.

8. The method of claim 1, wherein determining the corresponding cost associated with the marginal power reduction for each of the plurality of facility systems includes utilizing an artificial intelligence system.

9. The method of claim 8, wherein the artificial intelligence system utilizes a rules database or heuristic algorithms.

10. The method of claim 8, wherein the artificial intelligence system utilizes a one or more heuristic algorithms.

11. The method of claim 1, wherein in addition to incrementally reducing a power allocation to the facility system of the plurality of facility systems that is determined to have a lowest marginal cost of power reduction, reduction of the total level of power consumption within the facility is achieved by reallocated power between multiple facility systems of the plurality of facility systems.

12. The method of claim 1, wherein in addition to incrementally reducing a power allocation to the facility system of the plurality of facility systems that is determined to have a lowest marginal cost of power reduction, reduction of the total level of power consumption within the facility is achieved by rescheduling an operation of one or more of the plurality of facility systems.

13. A method for managing power demand from a particular power source within a facility, comprising:
   receiving a request to reduce a total level of power demanded from the particular power source within the facility by a predetermined measure;
   receiving a schedule of power needs for each of a plurality of facility systems;
   determining a corresponding cost associated with a marginal power reduction for each of the plurality of facility systems using the received plurality of operating parameters;
   determining a cost associated with increasing marginal power generation;
   incrementally reducing the power demand from the particular power source while satisfying the received schedule of power needs for each of the plurality of facility systems by performing one of marginally reducing power for one of the plurality of facility systems and marginally increasing power generation according to a lowest determined cost; and
   repeating the steps of determining a corresponding cost associated with a marginal power reduction for each of the plurality of facility systems, determining a cost associated with increasing marginal power generation, and incrementally reducing power demand until the total level of power demanded from the particular power within the facility has been reduced by the predetermined measure.

14. The method of claim 13, wherein increasing power generation includes generating power for utilization by the plurality of facility systems by combustion of fossil fuels.

15. The method of claim 13, wherein increasing power generation includes generating power for utilization by the plurality of facility systems by harnessing solar or wind power.

16. The method of claim 15, wherein an extent to which the request to reduce a total level of power demanded from the particular power source can be satisfied by harnessing solar or wind power is determined and incrementally reducing the power demand from the particular power source includes harnessing available solar or wind power prior to marginally reducing power for one of the plurality of facility systems and marginally increasing power generation according to a lowest determined cost.

17. The method of claim 13, wherein increasing power generation includes generating power for utilization by the plurality of facility systems by exploiting previously stored power.

18. A system for managing power consumption within a power-consuming facility, comprising:
   a rules database including rules governing how to generate, store, retrieve, acquire, and allocate available power between a plurality of facility systems of the facility including power-consuming devices, power-generating devices, and power-storing devices;
   a demand response orchestrator for receiving a request to reduce a total level of power consumption within the facility by a predetermined measure, the request having been sent by a power-generating entity, receiving a plurality of parameters as inputs, reading the rules of the rules database, and generating a plurality of control signals for controlling the generation, storage, retrieval, acquisition, and allocation of the available power between the plurality of facility systems to satisfy the request; and
   a plurality of sensors and meters located throughout the facility for generating at least some of the plurality of parameters and sending the generated parameters to the orchestrator.

19. The system of claim 18, wherein the power-consuming devices include an air temperature control system or manufacturing systems.

20. The system of claim 18, wherein the power-generating devices include a fossil fuel-powered generator or a renewable energy generator.

21. The system of claim 18, additionally including an Internet connection for providing parameters to the orchestrator by subscription.

* * * * *